United States Patent [19]
Enomoto

[11] Patent Number: 4,829,400
[45] Date of Patent: May 9, 1989

[54] GAS-INSULATED SWITCHGEAR

[75] Inventor: Hiroshi Enomoto, Hyogo, Japan

[73] Assignee: Mitsubishi Denki Kabushiki Kaisha, Tokyo, Japan

[21] Appl. No.: 113,094

[22] Filed: Oct. 27, 1987

[30] Foreign Application Priority Data

Nov. 28, 1986 [JP] Japan .............................. 61-184578[U]

[51] Int. Cl.$^4$ .............................................. H02B 1/04
[52] U.S. Cl. ...................................... 361/341; 361/335
[58] Field of Search ............... 361/331, 332, 333, 334, 361/335, 341, 355, 361, 363, 376; 200/148 B, 148 D, 148 E, 148 F, 148 R, 145; 307/17, 42, 83, 147, 148

[56] References Cited

U.S. PATENT DOCUMENTS

| | | | |
|---|---|---|---|
| 4,237,520 | 12/1980 | Oishi et al. | 361/335 |
| 4,503,481 | 3/1985 | Fujiya et al. | 361/341 |
| 4,570,042 | 2/1986 | Yanabu et al. | 200/148 R |
| 4,677,525 | 6/1987 | Mitomo | 361/341 |
| 4,687,890 | 8/1987 | Yamamoto et al. | 200/148 B |

Primary Examiner—A. D. Pellinen
Assistant Examiner—David A. Osborn
Attorney, Agent, or Firm—Sughrue, Mion, Zinn, Macpeak, and Seas

[57] ABSTRACT

A gas-insulated switchgear is constituted with a pair of electric units arranged above and below a main bus. The units are connected to the main bus by lead buses branched from the main bus.

3 Claims, 4 Drawing Sheets

GAS-INSULATED SWITCHGEAR

BACKGROUND OF THE INVENTION

The present invention relates to a gas-insulated switchgear having gas sealed metal conduits each housing at least a main bus and components of switching devices which are connected thereto by lead buses branched from the main bus, and particularly, to an improvement thereof to reduce an installation area thereof and the number of other components thereof.

FIGS. 1 and 2 are a plan and side views of a conventional gas-insulated switchgear shown in, for example, Japanese Utility Model Application Laid-open No. 73113/1981, respectively, which is of a combined three-phase type and is composed of a pair of electric units 10. In these figures, a reference numeral 1 depicts main buses each including three different phase conductors. Each main bus 1 extends through a gas filled metal conduit 1a and is insulatingly supported thereby. The main buses 1 are parallel to each other, one of which is for an auxiliary purpose. A reference numeral 2 depicts lead buses each including three different phase conductors branched from each of the main buses 1, all of the lead conductors 2a the main buses 1 of each conduit 1a extending through a sealed metal conduit 2a. A reference numeral 3 depicts a pair of three-phase disconnecting switches connected to the respective lead concuctors 2, 4 a pair of vertically arranged commutators, 5 three-phase circuit breakers, 6 control devices of the gas-insulated switch device, 7 three-phase disconnecting switches, 8 sealed metal conduits enclosing junctions between terminals of the lead conductors 2 and cables 22 for external connection and 9 grounding means. The disconnecting switches 3 and 7, the commutators 4, the circuit breakers 5 and the grounding means 9 are associated with gas-sealed, rigid metal containers which are filled with insulating gas.

A plurarity of the units 10 each constructed as mentioned above are arranged side by side above two pairs of the three-phase main buses 1 which are orthogonal thereto. The sealed conduits 1a are connected by flexible joints 21 mutually, FIGS. 3 and 4 are a plan and side views, respectively, of another example of the conventional gas-insulated which is of phase-separation type and is shown as including two three-phase units 20 each including three single phase main buses 11 arranged in a sealed metal conduit 11a. One of the units is for an auxiliary purpose. Lead buses 12 each including a lead conductor branched from the respective main buses 11 extend through metal conduits 12a and through metal conduits 12b and 12c. A pair of disconnecting switches 13 of phase-separation type are connected to the respective lead buses 12. A pair of vertically arranged commutators 14, circuit breakers 15 of phase-separation type, control devices 16 for the gas insulated electric unit, disconnecting switches 17 of phase-separation type, sealed metal containers 18 for enclosing joints between terminals of the lead buses 12 and cables 24 for external connection and grounding means 19 are also provided. The disconnecting switches 13 and 17, the commutators 14, the circuit breakers 15 and the grounding means 19 have frames each comprising a sealed metal container which is gas-filled.

The three-phase units 20 each composed of three single phase circuits are arranged above a pair of the parallel three-phase main buses each composed of three main buses 11, orthogonally thereto. Sealed metal conduits 11a for the main buses 11 of the units 20 are connected by flexible joints 23 to each other.

In the conventional gas-insulated device constructed as above, the installation area of the units increases proportionally to the number of the units, and the number of the main buses as well as their conduits has to be equal to the number of, the units. Further, the flexible joints 21 and 23 must be sufficient in number too.

U.S. Pat. No. 4,237,520 to Oishi et al discloses vertically arranged electric units. Since in this Patent the electric units have their elements arranged in straight-line fashion, the installation area thereof is not reduced sufficiently.

SUMMARY OF THE INVENTION

An object of the present invention is to provide a gas-insulated electric device which requires a minimized installation area, minimized length of main buses, minimized number of sealed conduits and minimized number of flexible joints.

According to the present invention, the above object is achieved by arranging units of the electric device above and below horizontally parallel main buses in a direction orthogonal to the main buses and branching the main buses in vertical directions to connect the units thereto.

The gas-insulated electric device according to the present invention requires an installation area which is substantially one half that of the conventional device and the length of the lead conductors from the main buses to the units as well as the number of the sealed metal conduits is reduced to substantially one half of those required in the conventional device, respectively.

DETAILED DESCRIPTION OF THE PREFERRED EMBODIMENTS

Figure 1:
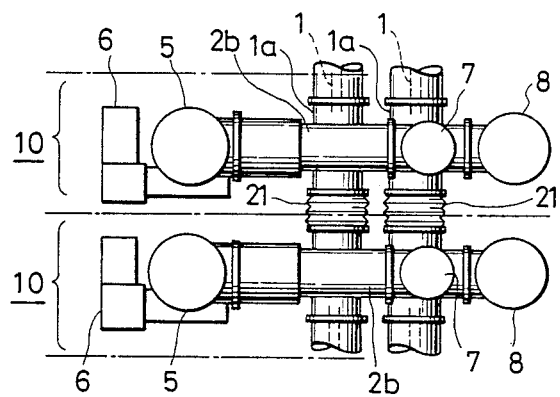
FIGS. 1 and 2 are a plan view and a partially cross sectioned side view of a conventional gas-insulated switchgear, respectively.
Figure 2:
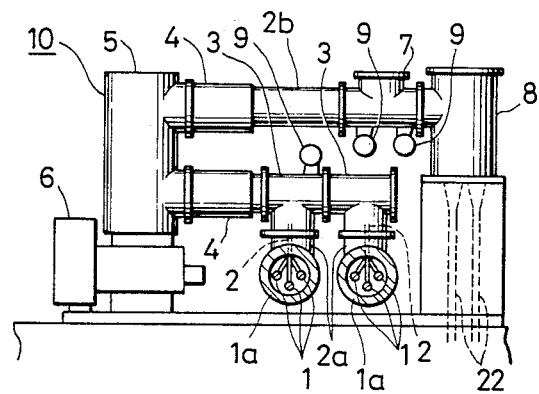
Figure 5:
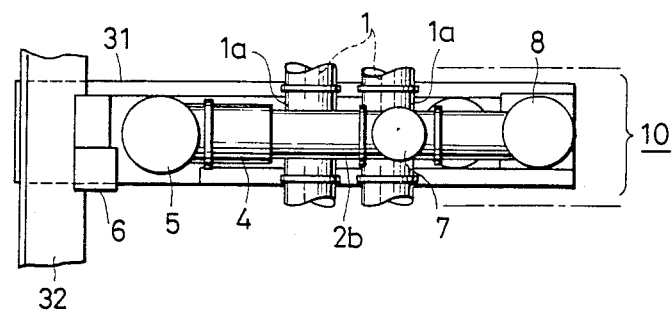
FIGS. 5 and 6 are a plan view and a partially cross sectioned side view of an embodiment of the present invention, respectively.
Figure 6:
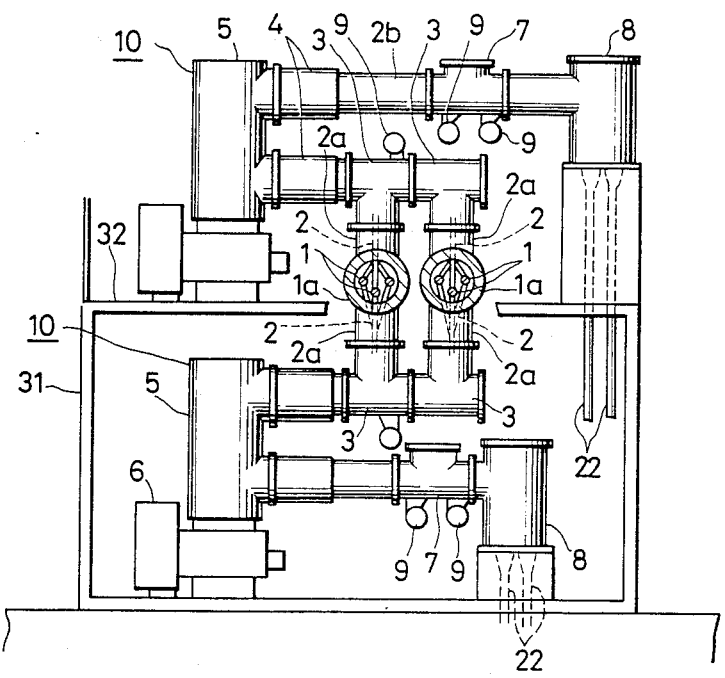

In FIGS. 5 and 6 which show an embodiment of the present invention in plan and side views, respectively, a pair of electric units 10, components of which are identical to those shown in FIGS. 1 and 2, are arranged as to be described. For simplicity of description of the present invention, details of the respective components of the units are omitted.

Lead buses 2 are branched vertically from main buses 1 and connected to disconnectors 3 and then to commutators 4, circuit breakers 5, control devices 6, commutators 4, disconnectors 7 and cables 22, to constitute the over/under arranged units 10. The units 10 are parallel to each other and orthogonal to the main buses 1. The upper unit 10 is mounted on a frame 31. A reference numeral 32 depicts a footboard bridging adjacent frames 31.

Figure 3:
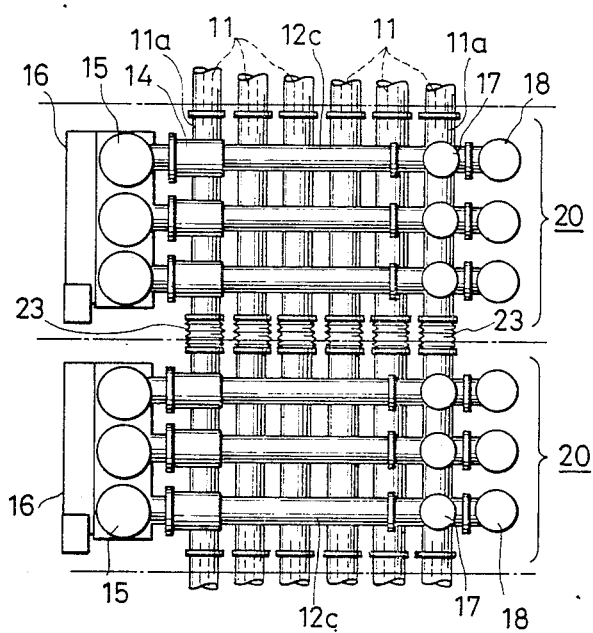
FIGS. 3 and 4 are a plan view and a partially cross sectioned side view of another conventional gas-insulated switchgear, respectively.
Figure 4:
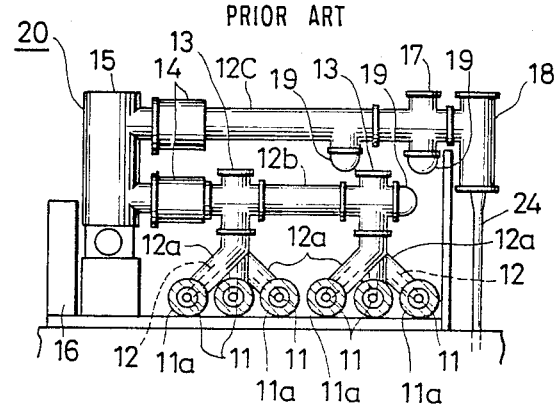
Figure 7:
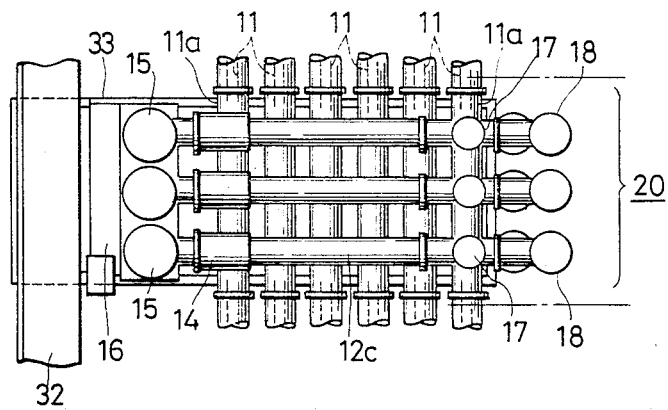
FIGS. 7 and 8 are a plan view and a partially cross sectioned side view of another embodiment of the present invention, respectively.
Figure 8:
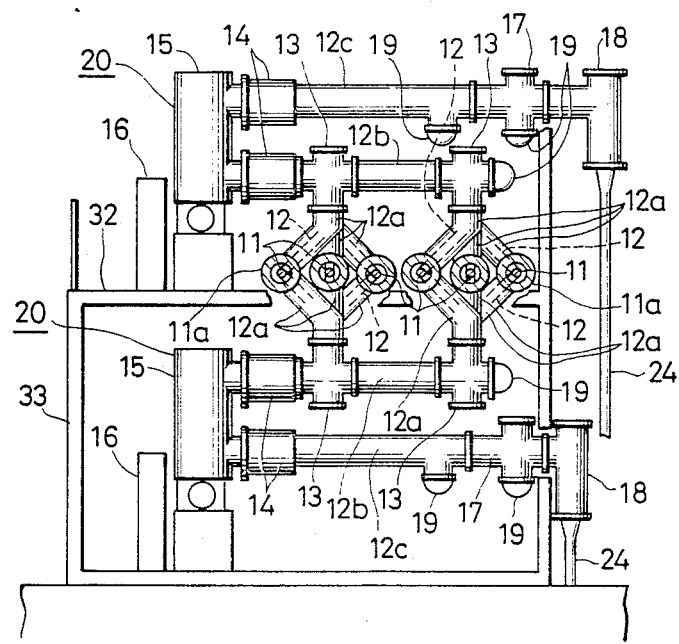

FIGS. 7 and 8 show another embodiment of the present invention in plan and partially cross sectioned side views, respectively. In FIGS. 7 and 8, a pair of units 20 are arranged above and below two sets of parallel main buses 11, each set including three buses each carrying one phase, respectively. Components constituting this embodiment are identical to those of the conventional device shown in FIGS. 3 and 4 and shown by the same reference numerals as those used in FIGS. 3 and 4. Therefore, details thereof are omitted for simplicity of description. Lead buses 12 branched from each main bus 11 extend vertically with or without inclination and are connected to disconnecting switches 13, commutators 14, disconnecting switches 17 and cables 24. The direction of the three phase units 20 is orthogonal to the main buses 11 and the upper unit 20 is mounted on a frame 33 as in the former embodiment. A reference numeral 32 is a footboard bridging adjacent frames 33.

Although one pair of the units are shown in the respective embodiments, two or more such unit pairs may be arranged along the main buses with the respective main buses 1 and 11 being connected to each other, respectively, and sealed metal conduits 1a and 11a being connected by flexible joints 21 and 23, respectively. The circuit breakers 6 and 16 in the respective embodiments may be omitted, if necessary.

As described hereinbefore, according to the present invention, the units of the gas-insulated switchgear are arranged above and below the main buses and are connected to the main buses by the lead buses branched therefrom and extending vertically thereto. Therefore, the installation area thereof becomes substantially a half of that required for the conventional device. Further, the total length of the main bus, the number of the sealed metal conduits and the number of the flexible joints are reduced to substantially half of those required in the conventional device, respectively.

What is claimed is:

1. A gas-insulated switch gear, comprising:
   at least a first pair of electric units (10), vertically disposed one on top of the other;
   at least a first pair of insulating, gas filled, sealed metal conduits (1a) disposed between said first pair of electric units;
   a first plurality of lead buses (2) connected to respective ones of said first pair of electric units;
   a first plurality of main buses (1) connected to respective ones of said first pair of electric units by said first plurality of lead buses, and passing through a respective one of said first pair of conduits, such that both of said pair of electric units share the same ones of said main buses;
   wherein each of said units comprises:
   a pair of disconnectors (3) connected to respective ones of said first plurality of lead buses;
   a pair of first commutators (4) connected to one of said disconnectors;
   a circuit breaker (5) connected to one of said pair of first commutators, such that said first pair of electric units have respective circuit breakers vertically disposed one on top of the other, said main buses being disposed between said vertically disposed circuit breakers;
   a second commutator (4) connected to said circuit breaker and disposed in the same vertical plane as said pair of first commutators;
   a metal conduit (2b) connected to said second commutator and extending horizontally therefrom;
   a disconnecting switch (7) connected to and extending along a horizontal axis from said metal conduit;
   a sealed metal container (8) connected to said disconnecting switch along said horizontal axis; and
   cable (22) disposed within said sealed metal container.

2. A gas-insulated switch gear as claimed in claim 1, further comprising:
   a second pair of electric units;
   a second pair of insulating, gas filled, sealed metal conduits (1a) disposed between said pair of electric units;
   a second plurality of lead buses (2) connected to respective ones of said second pair of electric units; and
   a second plurality of main buses (1) connected to respective ones of said electric units by said lead buses, and passing through a respective one of said second pair of conduits, such that both of said second pair of electric units share the same ones of said main buses; and
   a first plurality of flexible connectors (21) connecting respective ones of said first and second pluralities of main buses.

3. A gas-insulated switch gear as claimed in claim 2, wherein said second pair of electric units are vertically disposed one on top of the other, and each of said second pair of electric units includes a circuit breaker such that respective circuit breakers of said second pair of electric units are arranged one on top of the other, with said second plurality of main buses being disposed between said vertically disposed circuit breakers.

* * * * *